United States Patent
Hoagland

(10) Patent No.: US 6,460,888 B1
(45) Date of Patent: Oct. 8, 2002

(54) COLLAPSIBLE STEERING COLUMN

(76) Inventor: Larry D. Hoagland, 6314 Peacemaker La., Noblesville, IN (US) 46060

( * ) Notice: Subject to any disclaimer, the term of this patent is extended or adjusted under 35 U.S.C. 154(b) by 0 days.

(21) Appl. No.: 09/626,373

(22) Filed: Jul. 26, 2000

(51) Int. Cl.$^7$ .................................................. B62D 1/19
(52) U.S. Cl. ........................................ 280/777; 74/492
(58) Field of Search ................................ 280/775, 777; 74/492, 493; B62D 1/18, 1/185, 1/19

(56) References Cited

U.S. PATENT DOCUMENTS

| | | | |
|---|---|---|---|
| 3,771,379 A | * 11/1973 | Rohrbach | 74/492 |
| 3,851,374 A | * 12/1974 | Mazelsky | 29/455 |
| 4,531,619 A | * 7/1985 | Eckels | 188/371 |
| 4,632,424 A | * 12/1986 | Morris | 280/777 |
| 4,674,354 A | * 6/1987 | Brand | 74/492 |
| 4,850,239 A | * 7/1989 | Oosterwal | 74/493 |
| 5,242,195 A | * 9/1993 | Wendling | 280/777 |
| 5,476,284 A | * 12/1995 | DuRocher et al. | 280/777 |
| 5,618,058 A | * 4/1997 | Byon | 280/777 |
| 5,626,363 A | * 5/1997 | Rispeter | 280/775 |
| 5,836,211 A | * 11/1998 | Ross et al. | 74/493 |
| 5,893,580 A | * 4/1999 | Hoagland et al. | 280/731 |
| 6,227,571 B1 | * 5/2001 | Sheng et al. | 280/777 |

FOREIGN PATENT DOCUMENTS

| | | | | |
|---|---|---|---|---|
| DE | 3803401 A1 | * 2/1988 | | B62D/1/19 |
| JP | 02001278065 A | * 10/2001 | | B62D/1/10 |

* cited by examiner

Primary Examiner—Paul N. Dickson
Assistant Examiner—Paul Royal, Jr.
(74) Attorney, Agent, or Firm—Woodard, Emhardt, Naughton, Moriarty & McNett

(57) ABSTRACT

A collapsible steering column for use in an automotive vehicle having steering linkage, an instrument panel and a steering wheel, includes an upper sleeve having an axis and defining a rearwardly opening cavity and a rear end configured for connection to a steering wheel, the cavity having a rear wall; a lower shaft having an axis and a forward end configured for connection to vehicle steering linkage and having an upper end extending coaxially at least partially within the cavity; a spring disposed within the cavity between the shaft and the rear wall of the cavity; a mating configuration between the sleeve and the shaft for causing the sleeve and the shaft to rotated as a unit about their common axes; and, a detent assembly connected with the sleeve and the vehicle instrument panel for holding the sleeve conditionally against axial movement unless sufficient axial force is applied to the sleeve.

1 Claim, 1 Drawing Sheet

COLLAPSIBLE STEERING COLUMN

FIELD OF THE INVENTION

The present invention relates to the field of steering columns for automotive vehicles, and specifically to a collapsible, energy and motion distributing steering column.

BACKGROUND OF THE INVENTION

Steering columns in automotive vehicles typically comprise axially extending cylindrical bodies, with shafts or other linkage elements therein extending from the vehicle steering gear or linkage upwardly and rearwardly to the steering wheel. In the event of a front end collision, the steering linkage and forward end of the steering column shaft may be almost instantaneously rammed rearwardly, directly into the head and/or chest of the driver. In this and other collision scenarios, where there is no steering-wheel-mounted airbag, a driver not wearing a seatbelt could also be catapulted forward into the steering wheel with often critical or fatal results.

Attempts have been made to cushion the impact between the driver and the steering wheel in a collision situation, such as the steering-wheel-mounted airbag. U.S. Pat. No. 4,867,003 to Beauch et al. shows another approach where the steering column includes roll deforming steel balls juxtaposed between cylindrically overlapping, ball-engaging sleeves of the column so that, in the event of a significant forward impact against the steering wheel, the upper column sleeve breaks from its bolted connection to the instrument panel and telescopically collapses. Resistance to the collapse is incurred by friction between the telescopic sleeves and the balls therebetween.

SUMMARY OF THE INVENTION

A collapsible steering column is disclosed for use in an automotive vehicle having steering linkage, an instrument panel and a steering wheel. The collapsible steering column includes an upper sleeve having an axis and defining a rearwardly opening cavity and a rear end configured for connection to a steering wheel, the cavity having a rear wall; a lower shaft having an axis and a forward end configured for connection to vehicle steering linkage and having an upper end extending coaxially at least partially within the cavity; a spring disposed within the cavity between the shaft and the rear wall of the cavity; a mating configuration between the sleeve and the shaft for causing the sleeve and the shaft to rotate as a unit about their common axes; and, a detent assembly connected with the sleeve and the vehicle instrument panel for holding the sleeve conditionally against axial movement unless sufficient axial force is applied to the sleeve.

DESCRIPTION OF THE PREFERRED EMBODIMENT

Figure 1:
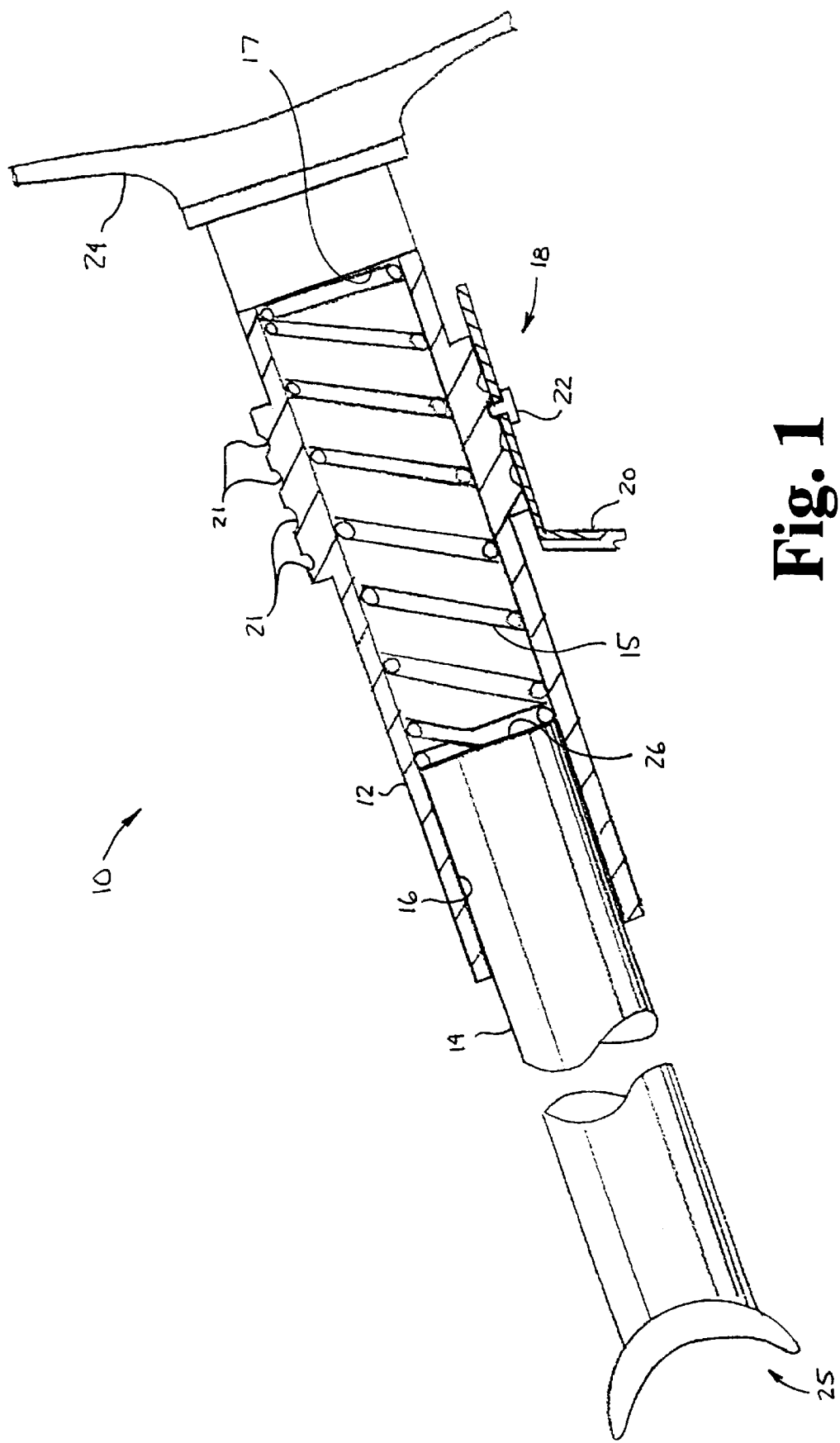
FIG. 1 is a side, cross-sectional, diagrammatic view of a collapsible steering column in accordance with the preferred embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, and that any alterations or modifications in the illustrated device, and any further applications of the principles of the invention as illustrated therein are contemplated as would normally occur to one skilled in the art to which the invention relates.

Referring now to FIG. 1, there is shown a collapsible steering column 10 in accordance with the preferred embodiment of the present invention. Column 10 generally includes an upper sleeve 12, a lower shaft 14 and a spring 15. Upper sleeve 12 defines an internal, axially extending cavity 16 that opens forwardly and is sized and shaped to receive the rearward end of shaft 14, as shown. Cavity 16 terminates rearwardly at rear wall 17. Sleeve 12 includes an appropriate type of detent mechanism 18 operationally connected between sleeve 12 and the vehicle instrument panel 20 to permit sleeve 12 to be positioned and releaseably locked at numerous locations along its axis relative to instrument panel 20 and, upon application of sufficient axial force, to permit sleeve 12 to be impelled along its axis, overriding the detent holding force. In one embodiment, the detent mechanism 18 includes a series of axially spaced, circumferential grooves 21 defined on the external surface of sleeve 12, and further includes a locking pin 22 that is held by instrument panel 20. A biasing mechanism, such as a spring (not shown) biases pin 22 to seat in one of the grooves 21 whereby sleeve 12 may rotate about its axis (by virtue of pin 22 riding within a groove 21), but is substantially held against movement along its axis unless enough force is applied to sleeve 12 along its axis to overcome the holding force of detent mechanism 18. Such detent mechanisms 18 are well known, and other of such detent mechanisms 18 may be used to conditionally hold sleeve 12 as described herein. A steering wheel 24 is connected to the rearward end of sleeve 12 in an appropriate manner.

Lower shaft 14 is connected at its lower end via a C-joint to the vehicle steering gear (generally indicated at 25). The upper end of lower shaft 14 is sized and shaped to extend into and telescopically reciprocate within cavity 16. Cavity 16 and the upper end of shaft 14 have mutually mating configurations so that shaft 14 rotates as a unit with sleeve 12 when shaft 14 is received within cavity 16. Such mating configurations may include, without limitation, splines or a D-shaped cross-section. Alternative structures whereby sleeve 12 and shaft 14 rotate about their common axis as a unit are also contemplated by the present invention. Spring 15 is disposed within cavity 16, between the rear end 26 of shaft 14 and rear wall 17 of cavity 16.

The holding action of detent mechanism 18 to substantially prevent axial movement of sleeve 12, and the axial length and spring constant of spring 15 may be chosen to define a range of actions of collapsible steering column 10. In one embodiment, for example, for all axial positions under which detent mechanism 18 can be engaged and conditionally hold sleeve 12, the axial length of spring 15 is such that spring 15 extends all the way from rear end 26 to rear wall 17, under at least slight compression. Further, the holding force of detent mechanism 18 and the spring constant of spring 15 are such that, upon application of an axial force to the front of shaft 14, shaft 14 will telescopically slide rearwardly into cavity 16, against the bias of spring 15, but the output force (at the rearward end of spring 15 against rear wall 17) will be less than the axial holding force of detent mechanism 18. As a result, shaft 14 may be impelled substantially all the way into cavity 16, and sleeve 12 will not be dislodged from detent mechanism 18 and from its position relative to instrument panel 20 (unless, of course, shaft 14 completely compresses spring 15 against rear wall 17, and the entire original input force is thereby applied through spring 15 and to rear wall 17). Short of shaft 14 extending all the way into cavity 16, the input force is transformed and held by spring 15 as potential energy, and sleeve 12 is held in place thus preventing sleeve 12 from being rammed into the driver.

Further in the present embodiment, in the event of a collision that sends the driver forward into steering wheel 24, detent mechanism 18 is configured so that the impact force (which is more than inconsequential) of the driver to the steering wheel 24, and consequently axially through to sleeve 12, overcomes the holding force of detent mechanism 18, and sleeve 12 collapses. That is, it moves axially forwardly, compressing spring 15 as the rearward end of shaft 14 is received within cavity 16. As a result, the driver does not experience the hard, often critically injurious impact against an immovable steering wheel. Instead, the driver experiences a considerably softer impact as the detent mechanism holding force is overcome and spring 15 is compressed.

Alternative embodiments are contemplated wherein similar results are achieved. For example, the multiple grooves 21 (or similar detent structure and/or operation) may be only one groove whereby the axial column length is not adjustable, but the dual motion and energy absorption are still present. Also, different spring constants and length as well is different detent numbers and settings may provide alternative and improved safety, convenience and cost effectiveness, and are contemplated within the scope of the present invention.

While the invention has been illustrated and described in detail in the drawings and foregoing description, the same is to be considered as illustrated and not restrictive in character, it being understood that only the preferred embodiment has been shown and described and that all changes and modifications that come within the spirit of the invention are desired to be protected.

What is claimed is:

1. A collapsible steering column for use in an automotive vehicle having steering linkage, an instrument panel and a steering wheel, comprising:

an upper sleeve having an axis and defining a rearwardly opening cavity and a rear end configured for connection to a steering wheel, the cavity having a rear wall;

a lower shaft having an axis and a forward end configured for connection to vehicle steering linkage and having an upper end extending coaxially at least partially within the cavity;

a spring disposed within the cavity between said shaft and the rear wall of the cavity;

mating means for causing said sleeve and said shaft to rotated as a unit about their common axes; and, detent means connected with said sleeve and the vehicle instrument panel for holding said sleeve conditionally against axial movement unless sufficient axial force is applied to said sleeve.

\* \* \* \* \*